United States Patent [19]
Merciez

[11] Patent Number: 5,096,657
[45] Date of Patent: Mar. 17, 1992

[54] REACTOR COOLANT VOID DETECTION SYSTEM

[75] Inventor: Walter R. Merciez, Lynchburg, Va.

[73] Assignee: The Babcock & Wilcox Company, New Orleans, La.

[21] Appl. No.: 316,377

[22] Filed: Feb. 27, 1989

[51] Int. Cl.$^5$ ............................................. G21C 17/00
[52] U.S. Cl. .................... 376/247; 376/252; 376/256; 376/258; 73/19.03
[58] Field of Search .............. 376/247, 252, 256, 258; 73/19.03

[56] References Cited

U.S. PATENT DOCUMENTS

| | | | |
|---|---|---|---|
| 3,234,100 | 2/1966 | Ogle | 176/19 |
| 3,240,674 | 3/1966 | Ledwidge | 176/19 |
| 3,264,863 | 8/1966 | Maropis | 73/67 |
| 4,365,505 | 12/1982 | Hölzl | 73/19 |
| 4,405,559 | 9/1983 | Tokarz | 376/247 |
| 4,411,858 | 10/1983 | Smith | 376/247 |
| 4,414,177 | 11/1983 | Tokarz | 376/247 |
| 4,418,035 | 11/1983 | Smith | 376/247 |
| 4,761,259 | 9/1988 | Marini et al. | 376/245 |
| 4,844,857 | 7/1989 | Conrads | 376/247 |

Primary Examiner—Robert L. Stoll
Assistant Examiner—N. Bhat
Attorney, Agent, or Firm—Vytas R. Matas; Robert J. Edwards; Eric Marich

[57] ABSTRACT

A system for detecting steam voids or bubbles within a reactor coolant system. A dynamic pressure transducer detects pressure fluctuations in the coolant system and produces signals representative of steam voids within the system. The signals produced by the transducer are conditioned and applied as an input to a microprocessor along with other inputs representative of other operating parameters for the reactor coolant system. The microprocessor adjusts the signals representative of steam voids within the system and displays same to the operator.

4 Claims, 1 Drawing Sheet

REACTOR COOLANT VOID DETECTION SYSTEM

TECHNICAL FIELD

The present invention relates, in general, to a system for monitoring the coolant within a reactor and, more particularly, to a system for detecting voids within the coolant by monitoring coolant pressure fluctuations.

BACKGROUND ART

A pressurized water cooled reactor system is, in essence, a closed loop hydraulic system having circulation pumps therein The reactor is essentially a heat engine and must be provided with adequate cooling to prevent overheating which would result in damage to the reactor. In order to maintain proper heat transfer from the reactor to the reactor coolant, it is desirable to prevent the formation of steam voids or bubbles within the coolant. Such steam voids or bubbles act as pressure surge chambers resulting in the loss of cooling to the reactor. To date, no method has been developed for determining the presence, and/or amount, of steam voids within the coolant in a reactor.

Because of the foregoing, it has become desirable to develop a system for detecting steam voids or bubbles within a reactor coolant system.

SUMMARY OF THE INVENTION

The present invention solves the problems associated with the prior art and other problems by providing a system for detecting steam voids or bubbles within a reactor coolant system. The system includes a dynamic pressure transducer which is received within the hot leg of the reactor coolant system. Signals produced by the dynamic pressure transducer are amplified, conditioned and applied as an input to a microprocessor. Other inputs to the microprocessor include signals representative of reactor coolant pressure, pressurizer level and coolant temperature. The microprocessor compares values of reactor coolant system pressure, temperature, pressurizer level and the void detection signal, and adjusts the void detection signal depending upon the reactor coolant system operating conditions. The void detection signal can be displayed on a meter and an alarm circuit, that is actuatable if the void detection signal exceeds predetermined setpoints.

BRIEF DESCRIPTION OF THE DRAWING

The single figure of the drawing is a schematic of a reactor coolant system with the void detection system of the present invention installed therein.

DESCRIPTION OF THE PREFERRED EMBODIMENT

Figure 1:
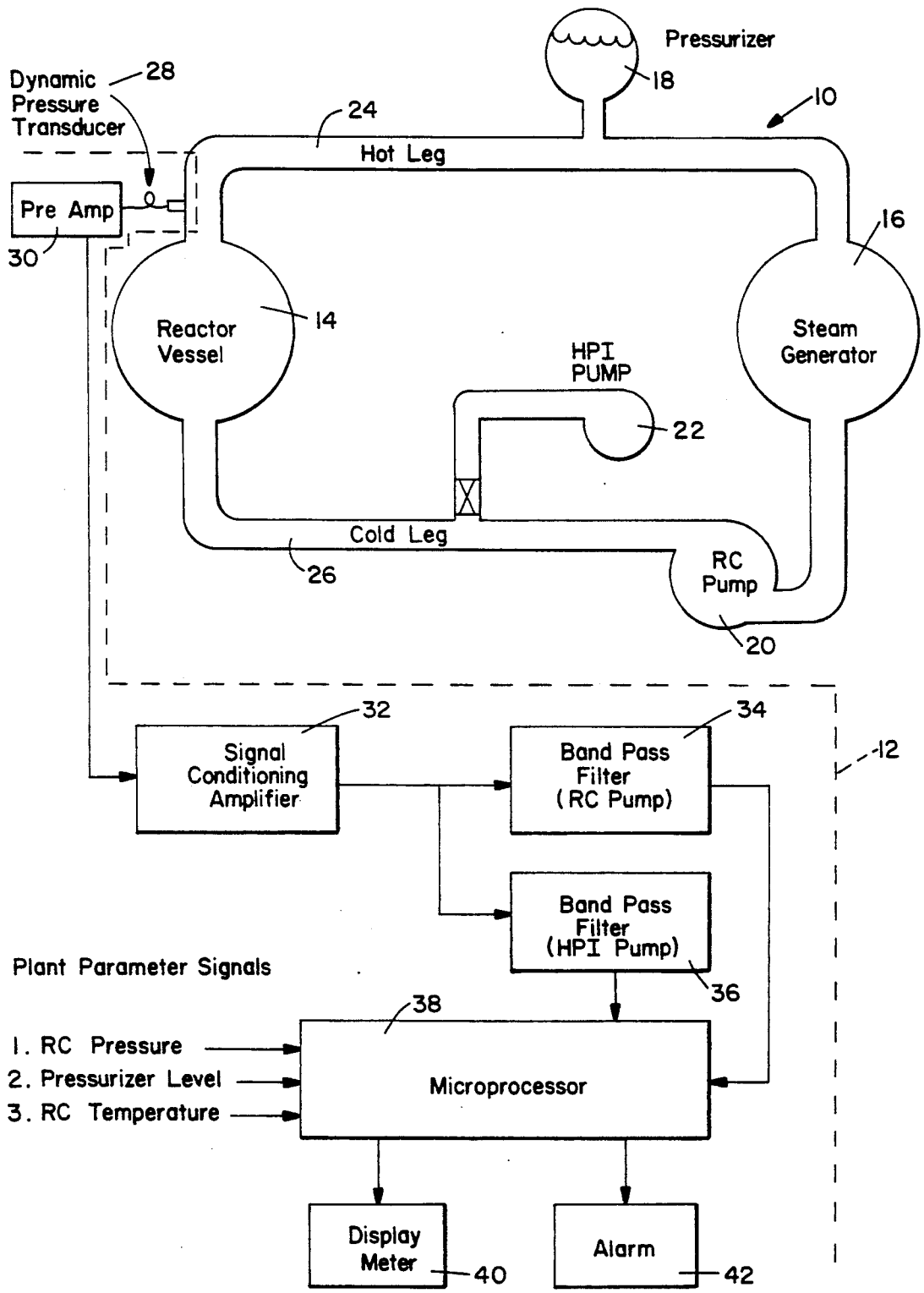

Referring now to the drawing where the illustration is for the purpose of describing the preferred embodiment of the present invention and is not intended to limit the invention hereto, the single figure of the drawing is a schematic diagram of a reactor coolant system 10 with the void detection system 12 of the present invention installed therein. The reactor coolant system 10 includes a reactor vessel 14, a steam generator 16, a pressurizer 18, a reactor coolant pump 20 and a high pressure injection pump 22 all interconnected as shown, i.e., the hot leg 24 of the coolant system 10 interconnects one side of the reactor vessel 14 with the pressurizer 18 and the steam generator 16, whereas the cold leg 26 interconnects the other side of the reactor vessel 14 with the outputs of the high pressure injection pump 22 and the reactor coolant pump 20 The other side of the steam generator 16 is connected to the inlet to the reactor coolant pump 20.

The void detection system 12 includes a dynamic pressure transducer 28 received within the hot leg 24 of the reactor coolant system 10, a preamplifier 30 which interconnects the pressure transducer 28 with a signal conditioning amplifier 32, band pass filters 34 and 36, and a microprocessor 38. The band pass filters 34 and 36 are selectively actuated depending upon whether the reactor coolant pump 20 or the high pressure injection pump 22 is operating, i.e., band pass filter 34 is associated with reactor coolant pump 20 whereas band pass filter 36 is associated with high pressure injection pump 22. Regardless of which band pass filter is actuated, the selected filter interconnects the output of signal conditioning amplifier 32 with an input to the microprocessor 38. Other inputs to the microprocessor 38 include signals representative of reactor coolant pressure, pressurizer level, and reactor coolant temperature. Outputs from the microprocessor 38 are connected to a display meter 40 and to an alarm 42.

During normal reactor operation, the reactor coolant pump 20 is operating providing circulation of cooling water to the reactor vessel 14. Pressure fluctuations from the pump impellers are transmitted by the cooling fluid throughout the system 10. The amplitude of these pressure fluctuations is inversely proportional to the void content of the fluid up to a certain level. During abnormal operation, such as loss of coolant and rapid depressurization of the system, the reactor coolant pump 20 may be shut off. At this time, the high pressure injection pump 22 is actuated to provide pressure impulses similar to that provided by the reactor coolant pump 20 during normal operation. The dynamic pressure transducer 28 detects pressure fluctuations induced into the system by the reactor coolant pump 20 or the high pressure injection pump 22 and produces a signal representative thereof. This dynamic signal is then conditioned by the preamplifier 30, the signal conditioning amplifier 32 and the appropriate band pass filter to make it suitable for processing by the microprocessor 38. The microprocessor 38 compares the values of reactor coolant system pressure, temperature, pressurizer level and the void detection signal and adjusts the signal produced by the transducer 28 depending upon reactor coolant system operating conditions. The modified void detection signal can then be displayed on the meter 40 to give an indication of voids within the reactor coolant system 10. In addition, an adjustable threshold detection circuit (not shown) can be provided to provide an output by the alarm 42 when certain operating parameters exceed predetermined levels.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. In a nuclear reactor having a reactor coolant system, said reactor coolant system including a reactor coolant pump and a high pressure injecting pump, a void detector for detecting coolant voids in said reactor coolant system, said void detector comprising:

dynamic pressure detection means, received within a hot leg by said system, for producing a signal representative of reactor coolant system pressure fluctuations induced into the system by the reactor coolant pump or by the high pressure injection pump;

filter means, operable upon the activation of the reactor coolant pump or the high pressure injection pump, for conditioning said signal representative of reactor coolant system pressure fluctuations; and microprocessor means for comparing said signal with other signals representative of reactor coolant system temperature, pressure and pressurizer level operating parameters to provide an indication as to coolant voids in the reactor coolant system.

2. The void detector as defined in claim 1 wherein said signal conditioning means includes amplifying means.

3. The void detector as defined in claim 1 further including means for indicating coolant voids existing in the reactor coolant system.

4. The void detector as defined in claim 1 further including alarm means actuatable when coolant voids in the coolant system exceed a predetermined level.

* * * * *